No. 684,228. Patented Oct. 8, 1901.
A. A. HAMILTON.
DRAFT EQUALIZER.
(Application filed June 22, 1901.)
(No Model.)
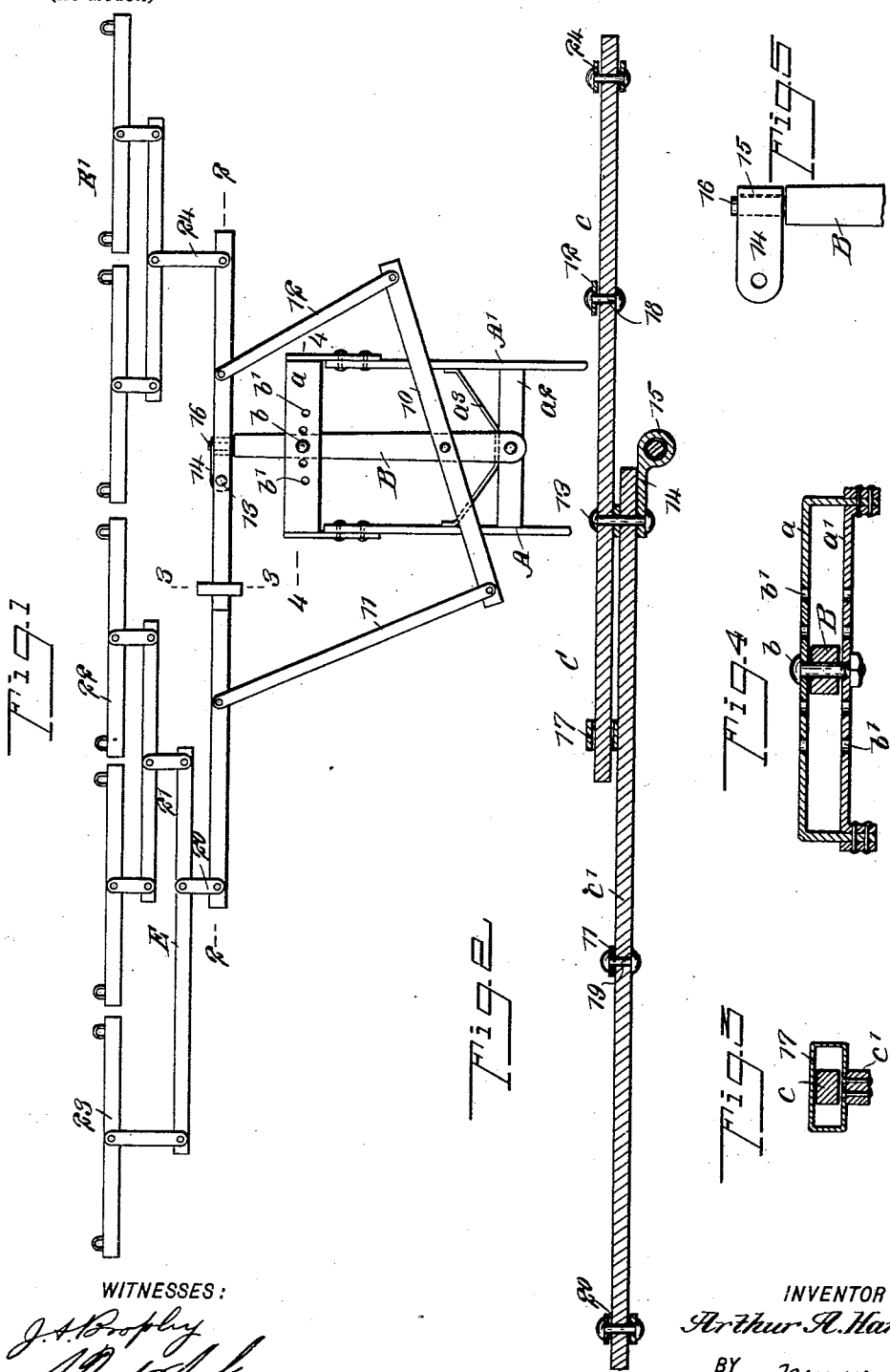
WITNESSES:
INVENTOR
Arthur A. Hamilton
BY
ATTORNEYS

UNITED STATES PATENT OFFICE.

ARTHUR A. HAMILTON, OF OCHEYEDAN, IOWA.

DRAFT-EQUALIZER.

SPECIFICATION forming part of Letters Patent No. 684,228, dated October 8, 1901.

Application filed June 22, 1901. Serial No. 65,626. (No model.)

*To all whom it may concern:*

Be it known that I, ARTHUR A. HAMILTON, a citizen of the United States, and a resident of Ocheyedan, in the county of Osceola and State of Iowa, have invented a new and Improved Draft-Equalizer, of which the following is a full, clear, and exact description.

The purpose of the invention is to provide an evener or draft-equalizer especially adapted for use with gang-plows capable of effective work at either the right or the left hand side of the gangs and to so construct the device that one horse will walk in the furrow, five horses being employed, while the other four horses will walk on the stubble, and so that each horse will be compelled to do an equal amount of work.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of my improved draft-equalizer attached to the gang-plow beams. Fig. 2 is an enlarged longitudinal section through the main equalizing-bar, the section being taken practically on the line 2 2 of Fig. 1. Fig. 3 is a transverse section taken substantially on the line 3 3 of Fig. 1. Fig. 4 is an enlarged transverse section taken practically on the line 4 4 of Fig. 1, and Fig. 5 is a detail view illustrating the manner in which the main equalizing-bar is connected with the beams of the plows.

A and A' indicate the plow-beams, the forward ends whereof are connected by a double transverse clevis comprising two members $a$ and $a'$, as shown in Fig. 4, and at the rear ends of the beams a cross-bar $a^2$ is secured, having suitable braces $a^3$, as shown in Fig. 1. The tongue or pole B is pivoted to the cross-bar $a^2$ and extends between the members of the clevis and forwardly beyond said members, being adjustably attached to said clevis through the medium of a pin $b$, passed through the tongue or pole and through any one of a series of apertures $b'$ in the clevis, as is shown in Fig. 4, so that the tongue or pole may be shifted to take more or less land. An auxiliary equalizing-bar 10 is centrally pivoted to the tongue or pole B near the rear end of the latter, and links 11 and 12 are pivoted to the ends of the auxiliary equalizing-bar, the left-hand link 11 being longer than the right-hand link 12, as is shown in Fig. 1.

The main equalizing-bar C is in two sections $c$ and $c'$, the section $c'$ being longer than the section $c$, as is best shown in Fig. 2. These two sections or members $c$ and $c'$ are pivotally connected by a pin 13. This pin is passed through the upper member $c$ at a point between its center and its left-hand end and is passed through the member $c'$ near its right-hand end. The pivot-pin 13 is secured in a plate 14, which extends longitudinally of the left-hand or lower member $c'$ of the main equalizing-bar, and the plate 14 is provided with a knuckle 15, which extends beyond the right-hand end of the said member $c'$, as is also shown in Fig. 2. This knuckle 15 receives a pin or a reduced section 16 at the forward end of the tongue or pole B, as is shown in both Figs. 1 and 5.

A strap-loop 17 is secured to the upper face of the left-hand member $c'$ of the main equalizing-bar C, and the left-hand end of the upper or right-hand member $c$ of the said main equalizing-bar is passed loosely through this strap-loop 17 and has more or less movement therein, as is shown in Fig. 3.

The short link connected with the auxiliary equalizing-bar 10 is pivotally attached to the upper or right-hand member $c$ of the main equalizing-bar C by means of a pivot-pin 18, as is shown in Figs. 1 and 2, and a similar pin 19 connects the opposing link 11, connected with the auxiliary equalizing-bar 10, with the lower or left-hand member $c'$ of the main equalizing-bar C, as is also shown in Fig. 2. A link 20 is pivotally attached to the left-hand end of the left-hand or lower member $c'$ of the main equalizing-bar C, and a draft-tree E is pivotally attached to this link at a point between its center and its right-hand end. This draft-tree comprises an evener-bar 21, which is pivoted to the main equalizing-bar, and a doubletree 22, which is pivoted to the evener-bar at its right-hand end, together with a singletree 23, which is pivoted to the evener-bar 21 at its left-hand end through the medium of a suitable link, as is shown in Fig. 1. Through the medium of a link 24 a doubletree E' is pivotally connected with the upper or right-hand member c of the main equalizing-bar C near its right-hand end, as is also shown in Fig. 2.

The arrangement of the members c and c' of the main equalizing-bar with reference to the loop-strap 17 is such that when the horses stop the end of the member c' of the main equalizing-bar C, where the three horses are hitched, will rest on the ground, and therefore the entire weight of the device does not rest upon the ends of the plow-beams. The loop-strap 17 also prevents the members of the main equalizing-bar from buckling up at their pivotal connections when the horses are pulling. The main draft comes upon the auxiliary equalizing-bar 10, and one horse walks in the furrow, while the other four horses walk on the stubble. By my arrangement of the equalizer the horses walk close to the plow. This equalizer can be used on either right-hand or left-hand gang-plows by simply reversing the order of the members of the main draft-equalizing bar C.

If the main equalizing-bar C were constructed in one section, the three horses would have great advantage over the two horses, as the three horses would not pull their share; but by constructing the main equalizing-bar C as described—namely, in two sections of unequal length pivotally connected at a point near the left-hand end of the section to which the two horses are attached and at the right-hand end of the section to which the three horses are hitched—the two sets of animals are compelled to pull evenly, the movements of the sections being controlled by the strap-loop 17.

Having thus described my invention, I claim as new and desire to secure by Letters Patent—

1. In a draft-equalizer, a main equalizing-bar constructed in two sections, a long and a short section, a pivot-pin connecting the two sections and passed through the shorter section between its center and its inner end and through the longer section near its inner end, means for limiting the movement of the sections relative to each other, and draft devices connected with the sections of the equalizing-bar, the draft device connected with the longer section of the bar accommodating a greater number of animals than the corresponding device applied to the shorter section of the bar, as described.

2. In a draft-equalizer, an auxiliary equalizing-bar, a tongue or pole to which the auxiliary equalizing-bar is pivotally attached, an extension projecting laterally from an end of the tongue or pole and swiveled thereto for movement in the vertical plane, a main equalizing-bar in two pivotally-connected members pivotally attached to the extension from the pole or tongue, links connecting the members of the main equalizing-bar with the end portions of the auxiliary equalizing-bar, a doubletree connected with one end of one member of the main equalizing-bar, and a draft-tree, including single and double trees, pivotally connected with the opposite end of the other member of the main equalizing-bar, as described.

3. In a draft-equalizer, the combination, with the plow-beam, a tongue or pole pivotally and adjustably supported by the plow-beam, a pivoted extension from the forward end of the tongue or pole at right angles to its length, and an auxiliary draft-bar pivoted upon the tongue or pole, of a main equalizing-bar made in two members pivotally connected, one member being over the other, a limiting-loop attached to one of the said members, through which the other member of the main equalizing-bar loosely passes, a pivotal connection between the two members of the main equalizing-bar and the extensions from the said tongue or pole, links connecting the auxiliary equalizing-bar with the members of the main equalizing-bar, and a doubletree carried by one of the members of the main equalizing-bar, and a draft-tree comprising a single and a double tree carried by the other member of the main equalizing-bar, as described.

4. In draft-equalizers, the combination, with a tongue or pole adapted for pivotal connection with the beams of a plow, an auxiliary equalizing-bar pivoted on the said tongue or pole, and links pivotally attached to the ends of the said auxiliary equalizing-bar, of a plate pivotally attached to the forward end of the said tongue or pole, extending at right angles therefrom, a main equalizing-bar comprising two members one above the other, the members being pivotally attached to the said pivot-pin serving to connect the said main equalizing-bar with the said plate, a connection between the links of the auxiliary equalizing-bar and the members of the main equalizing-bar, a loop-strap secured to one member of the main equalizing-bar, through which the other members pass and in which said passing member has play, a doubletree pivotally connected with one member of the main equalizing-bar, and a draft-tree comprising a singletree and a doubletree pivotally connected with the other member of the main equalizing-bar, as described.

5. In draft-equalizers, the combination, with the side beams of a gang-plow, a cross-bar connecting the rear portions of said beams and a double clevis connecting the forward ends of the said beams, the double clevis being provided with series of apertures, a tongue or pole pivoted to said cross-bar and mounted to slide between the members of a double clevis, a pin passed through one of the apertures in the double clevis and through the said tongue or pole, a plate pivotally attached to the outer end of the tongue or pole, an auxiliary equalizing-bar pivoted to the tongue or pole, and links extending from the ends of the said auxiliary equalizing-bar, of a main equalizing-bar comprising two pivotally-connected members having limited swinging movement one on the other, both of the members of the said main equalizing-bar being pivoted to the plate carried by the tongue or pole, a doubletree pivotally connected with one member of the main equalizing-bar, and a draft-tree comprising a doubletree and a singletree pivotally connected with the other member of the said main equalizing-bar, as set forth.

6. A draft-equalizer comprising a support, an equalizing-bar, a member forming a connection between the support and the bar, the said member having a horizontal eye engaging with the support and being connected with the equalizing-bar by a vertical pivot, and draft-trees carried by the equalizing-bar.

7. The combination with a structure including a clevis, of a tongue pivoted at its rear end in the rear of the clevis and passing through and beyond said clevis, means for laterally adjusting the tongue in the clevis, an equalizing-bar mounted on the tongue in front of the clevis, and draft-trees carried by the equalizer-bar.

8. The combination with a structure including a clevis, of a tongue pivoted in the rear of the clevis, and passing through and beyond said clevis, means for laterally adjusting the tongue in the clevis, a main equalizing-bar mounted on the tongue in front of the clevis, an auxiliary equalizing-bar pivoted in the rear of the clevis, links connecting the main and auxiliary equalizing-bars and draft-trees carried by the main equalizing-bar.

In testimony whereof I have signed my name to this specification in the presence of two subscribing witnesses.

ARTHUR A. HAMILTON.

Witnesses:
WILLIAM WINTHORPE,
GEORGE HAMILTON.